(12) United States Patent
Jierapipatanakul et al.

(10) Patent No.: US 6,512,658 B1
(45) Date of Patent: Jan. 28, 2003

(54) VISCOELASTIC VOICE COIL DAMPER FOR DISC DRIVES

(75) Inventors: Niroot Jierapipatanakul, Singapore (SG); Andre Liem, Singapore (SG); CheeWai Seetoh, Singapore (SG); Joseph Lau, Singapore (SG); Mo Xu, Singapore (SG); Victor Choo, Singapore (SG)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/569,528

(22) Filed: May 12, 2000

Related U.S. Application Data
(60) Provisional application No. 60/133,831, filed on May 12, 1999.

(51) Int. Cl.[7] ............................................. G11B 5/55
(52) U.S. Cl. ................................ 360/264.7; 360/265.8
(58) Field of Search ........................... 360/264.7, 264.8, 360/264.9, 265, 265.7, 265.8

(56) References Cited

U.S. PATENT DOCUMENTS

| | | | |
|---|---|---|---|
| 4,602,175 A | * | 7/1986 | Castagna ..................... 310/13 |
| 4,760,478 A | | 7/1988 | Pal et al. |
| 5,148,071 A | * | 9/1992 | Takahashi ................. 360/265.8 |
| 5,149,048 A | | 9/1992 | Morehouse et al. |
| 5,187,625 A | | 2/1993 | Blaeser et al. |
| 5,432,663 A | | 7/1995 | Ichihara |
| 5,606,477 A | | 2/1997 | Erpelding et al. |
| 5,666,242 A | | 9/1997 | Edwards et al. |
| 5,675,456 A | | 10/1997 | Myers |
| 5,761,184 A | | 6/1998 | Dauber et al. |
| 5,790,348 A | | 8/1998 | Alfred et al. |
| 5,914,836 A | | 6/1999 | Pottebaum |
| 5,930,071 A | | 7/1999 | Back |
| 5,999,374 A | * | 12/1999 | Kim ......................... 360/264.7 |
| 6,061,206 A | * | 5/2000 | Foisy et al. .............. 360/265.7 |
| 6,175,469 B1 | * | 1/2001 | Ahmad et al. ........... 360/97.02 |
| 6,252,746 B1 | * | 6/2001 | Cho ......................... 360/265.8 |
| 6,271,996 B1 | * | 8/2001 | Houk et al. .............. 360/244.9 |

\* cited by examiner

*Primary Examiner*—David L. Ometz
(74) *Attorney, Agent, or Firm*—Derek J. Berger

(57) ABSTRACT

A voice coil for a head positional assembly of a disc drive. The voice coil including a dampener which dampens vibrations occurring in the voice coil. The dampener includes a constraint material and a viscoelastic material.

18 Claims, 11 Drawing Sheets

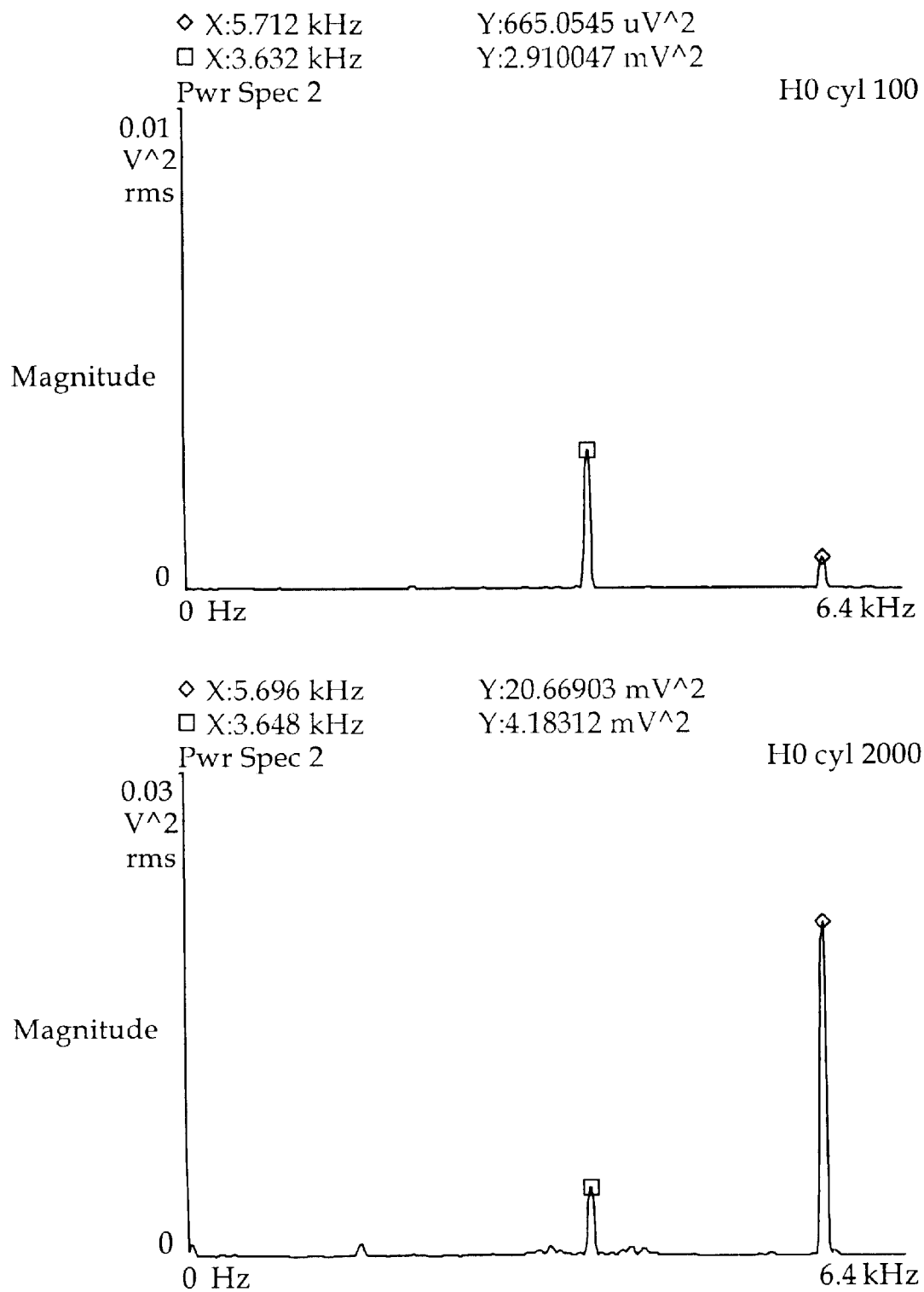

FIG. 7
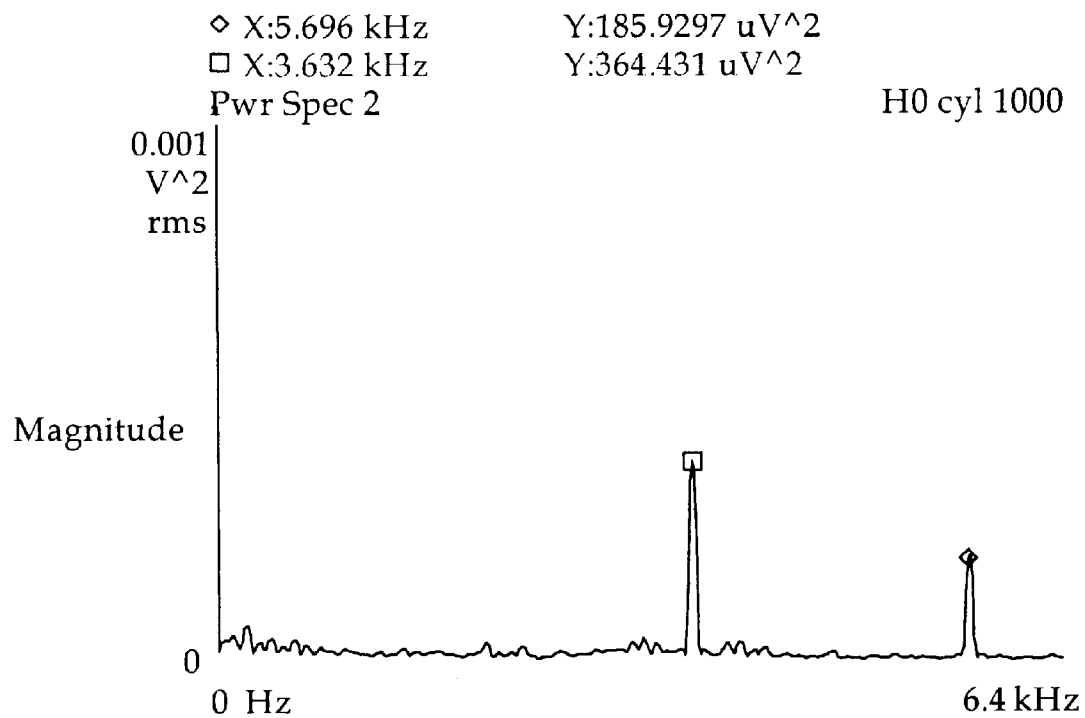
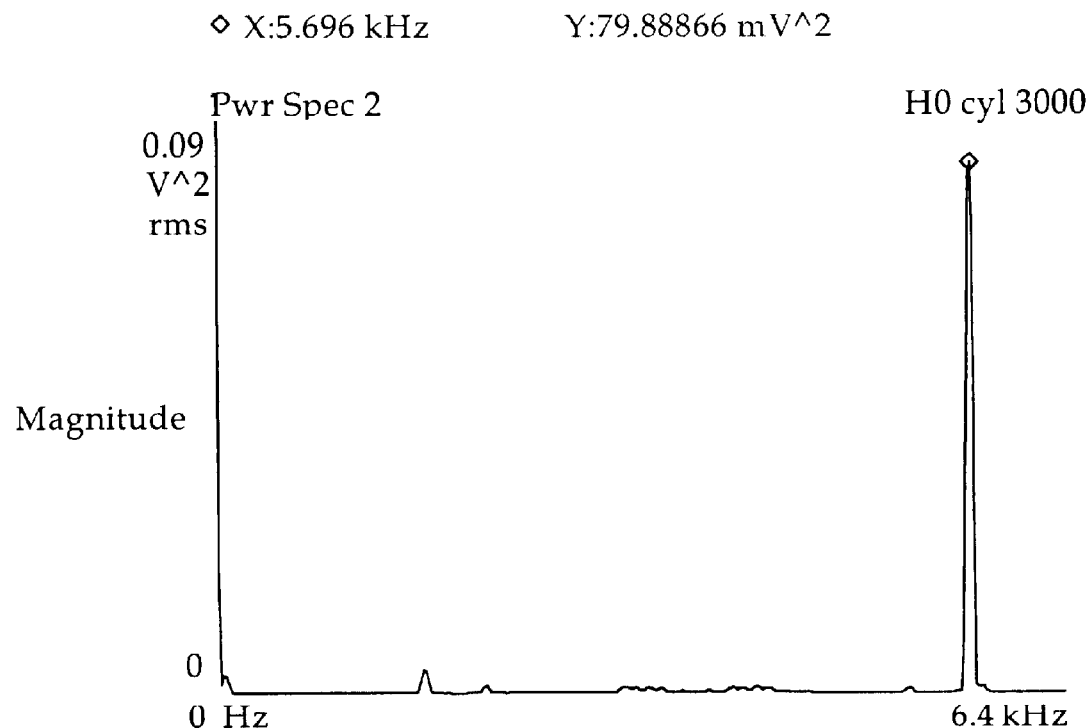
FIG. 8

VISCOELASTIC VOICE COIL DAMPER FOR DISC DRIVES

This application claims priority from U.S. provisional application No. 60/133,831 entitled Viscoelastic Coil Damper For Improved Disc Drive Performance, filed May 12,1999.

FIELD OF THE INVENTION

The present invention relates generally to a head positional assembly (HPA) for disc drives. More particularly, the present invention relates to a head positional assembly wherein the voice coil of the voice coil motor (VCM) is damped.

BACKGROUND OF THE INVENTION

Disc drives are used in computer applications for high volume data storage and retrieval. Typically, disc drives contain a head disc assembly (HDA) mounted on a base or disc enclosure. The head disc assembly includes an actuator slider system for transferring data to and from circular tracks concentrically disposed on the surfaces of the disc. Data is transferred to and from the discs as they are rotated at a predetermined speed on a spindle mechanism.

The actuator slider system or head positional assembly (HPA) includes a transducer mounted on a slider for transferring data to and from the disc. The slider is attached to an actuator arm via a gimbal assembly. The actuator arm pivots about the pivotal axis of an E-block assembly. Movement of the E-block assembly and the attached actuator slider system is controlled by a voice coil motor (VCM).

Ideally, the slider should precisely follow the motion of the E-block assembly within the frequency range of interest. This means that movement of the E-block assembly generated by the voice coil motor should be transmitted through the actuator arm, the gimbal assembly and to the slider without any distortion. In such ideal operating conditions, tracking can be performed efficiently and track densities on the disc can be increased. Unfortunately, due to vibrations within the system it is difficult to achieve such ideal conditions of operation. Vibration is a particularly serious problem when it occurs at or near the resonant frequencies of the components of the system.

Undamped, rigid mechanical structures have lower resonant frequencies than damped structures having the same effective stiffness. They also tend to exhibit vibrations of higher amplitude at resonant frequencies. For this reason, an undamped and rigid head positional assembly attains its structural resonance frequencies at lower excitation and also experiences larger amplitude vibrations at its resonance frequencies. These vibrations cause the servo control system of the head positional assembly to fail resulting in deteriorating disc drive performance. It can thus be appreciated that the mechanical structure of the head positional assembly will have a significant effect upon the capability of a disc drive to use discs of high track density.

Several methods have been developed to reduce vibration problems in the head positional assembly. One such method includes providing a damper on the gimbal assembly. However, this method is only effective if the gimbal assembly is the source of the resonance that is causing the vibrational problem.

Another method that has been employed is "frequency tuning". This involves designing the head positional assembly so that its resonant frequencies are not within the frequency range in which the servo control system of the disc drive is considered to be significantly affected by vibrations. However, it is difficult to predict actual resonant frequencies at the design stage, as resonances can be affected by several factors.

A further method employed has been to damp the pivot bearing on which the head positional assembly is mounted. U.S. Pat. No. 5,666,242 filed Nov. 21, 1995 by Edward et al for DISK DRIVE HAVING ELASTOMERIC INTERFACE IN PIVOT BEARING ASSEMBLY and U.S. Pat. No. 5,675,456 filed Nov. 21,1995 by Myers for ACOUSTIC VIBRATION DECOUPLER FOR A DISK DRIVE PIVOT BEARING ASSEMBLY describe methods of damping vibratory motion imparted to the head positional assembly through the pivot bearing. The former uses an elastomeric interface between the stationary member of the pivot bearing and the head positional assembly. The latter uses axial decoupling between the pivot shaft and the head positional assembly to minimise the transmission of acoustic vibration from the pivot shaft. U.S. Pat. No. 5,790,348 describes a head positional assembly having a cantilevered coil portion to provide damping of vibrations induced in the head positional assembly.

The present invention aims to provide a solution to the vibration problems mentioned above, and offers other advantages over the prior art.

SUMMARY OF THE INVENTION

The present invention relates to a voice coil for a head positional assembly of a disc drive. The voice coil includes a dampener which incorporates a constraint material and a viscoelastic material. The dampener is preferably located in the bobbin space.

The constraint material is selected from an aluminium, steel, zinc copper, ceramic, viscoelastic or elastomeric material. The viscoelastic material is preferably a double sided, pressure sensitive material. Vibrations produced in the voice coil are damped by the dampener and thus the head positional assembly is less susceptible to vibrations.

The voice coil is made from a coil of copper wire. Additionally, at least a portion of the voice coil may have a plastics overmold.

The present invention also relates to a disc drive having a head positional assembly including a voice coil and a dampener. The dampener includes a constraint material and a viscoelestic material.

These and various other features as well as advantages which characterize the present invention will be apparent upon reading of the following detailed description and review of the associated drawings.

BRIEF DESCRIPTION OF THE DRAWINGS

FIGS. 5 to 8 illustrate the positional error signal of a prior art disc drive at data track number 100, 1000, 2000 and 3000 respectively.

DETAILED DESCRIPTION

Figure 1:
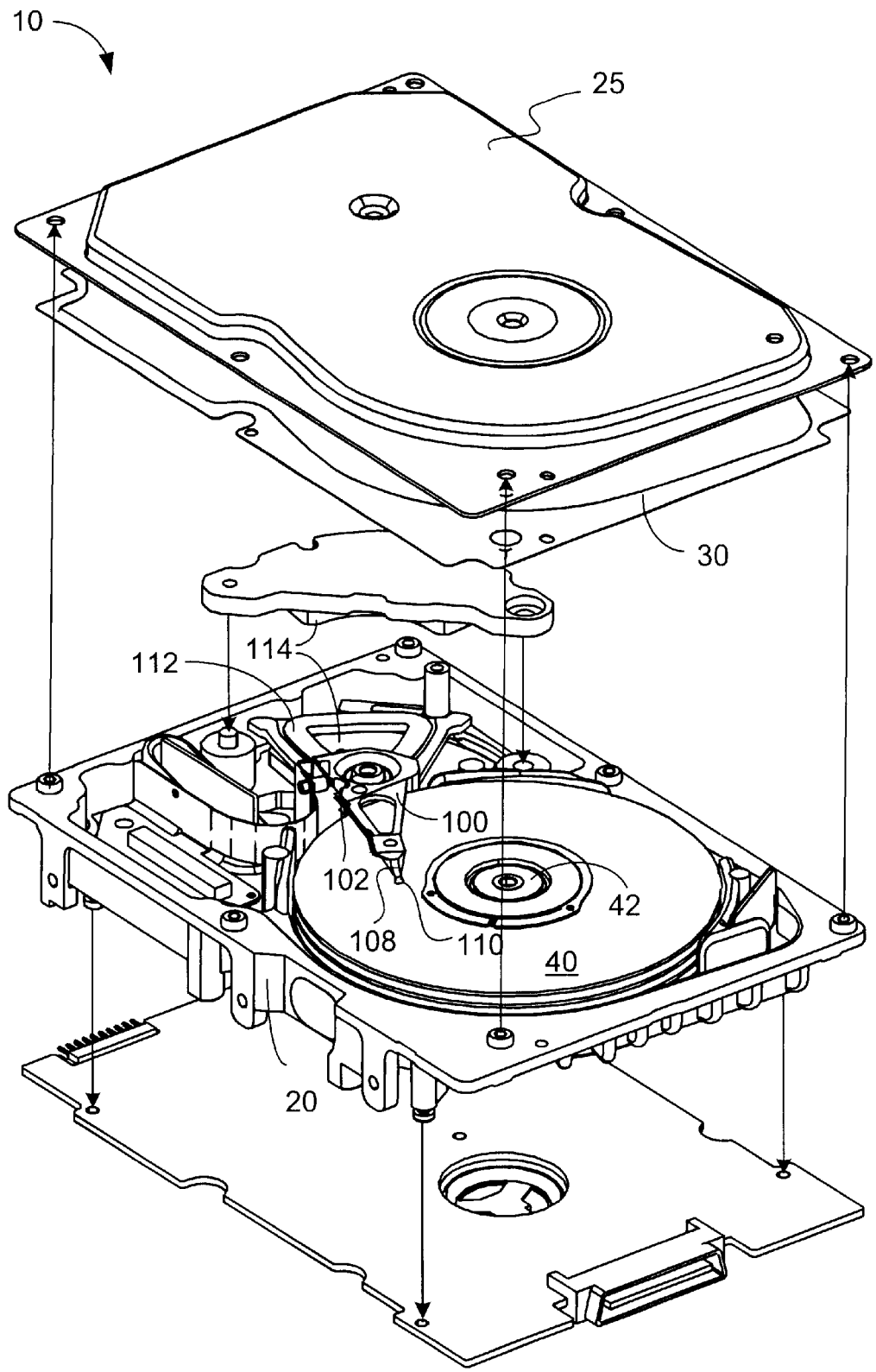
FIG. 1 is an exploded perspective view of a prior art disc drive.

FIG. 1 shows in exploded form a prior art disc drive 10. The disc drive 10 includes a housing base 20 and a top cover 25. Located between the housing base 20 and top cover 25 is a gasket 30 which, when engaged together, combine to form a sealed housing that maintains a clean environment inside the disc drive 10.

A disc 40 is mounted for rotation on a spindle hub 42. A head positional assembly 100 is mounted for movement about a pivot bearing 102. The head positional assembly 100 includes an E-block assembly 104 to which is attached at one side an actuator arm 106, a gimbal assembly 108, a slider 110 on which a transducer (not shown) is located. The slider 110 is arranged to be moved over the disc 40 so that the transducer (not shown) can read or write to the disc 40.

Attached to the other side of the E-block assembly 104 is a voice coil 112. The voice coil 112 is located in an electric field generated by a pair of permanent magnets 114 each mounted on pole pieces which are positioned substantially vertically above and below the voice coil 112. When an electric current is passed through the voice coil 112, an electromagnetic field is set up between the magnets 114 and the voice coil 112 so as to cause the voice coil 112 to move. As the voice coil 112 moves, the E-block assembly 104 is caused to pivot about pivot bearing 102 causing the sliders 110 to move across the surfaces of the disc 40. The voice coil 112, magnets 114 and pole pieces form the voice coil motor (VCM).

Figure 2:
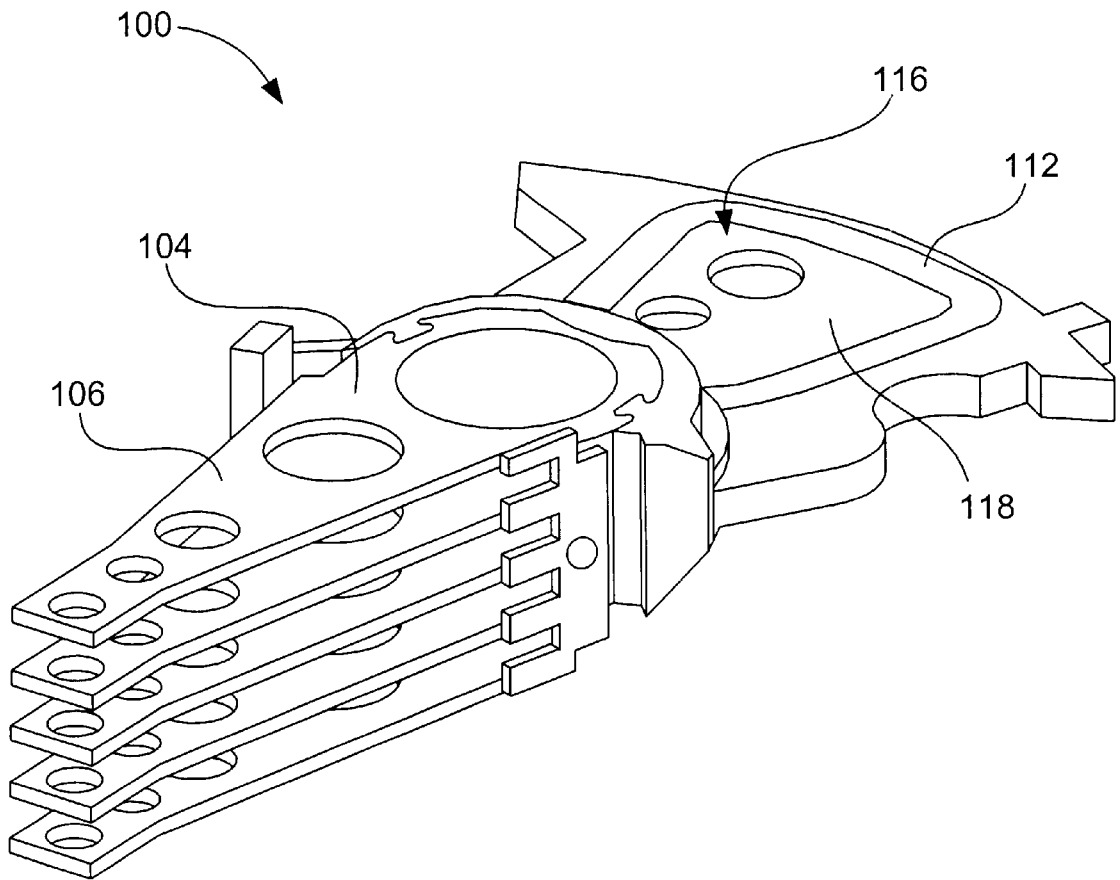
FIG. 2 is a schematic side view of a head positional assembly including a damped voice coil according to an embodiment of the invention.
Figure 3:
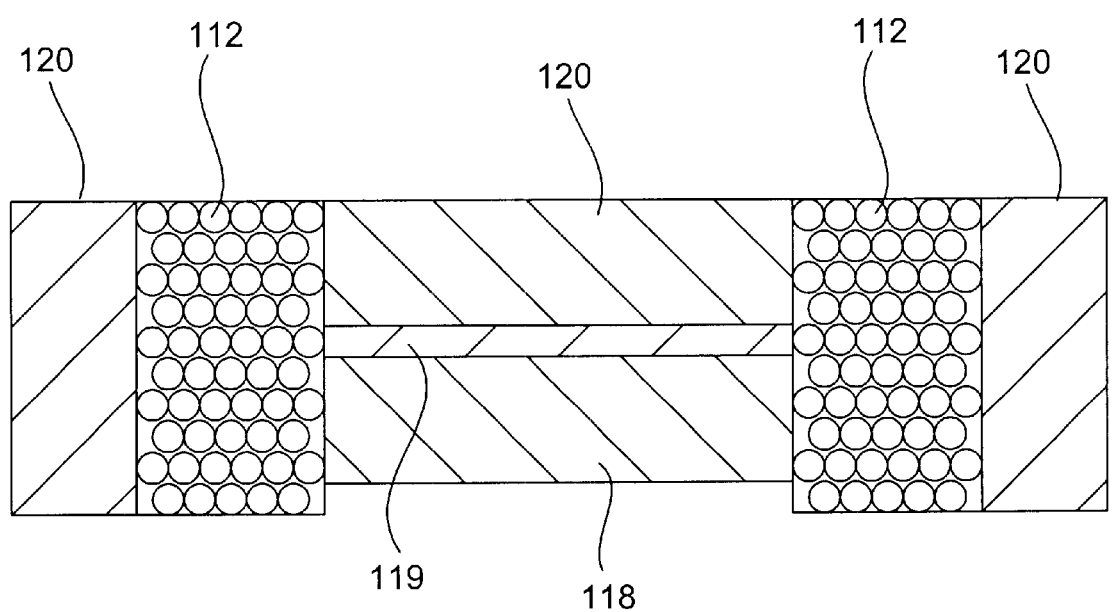
FIG. 3 is a schematic enlarged cross-sectional view of the damped voice coil shown in FIG. 2.

The voice coil 112 is typically made from copper wire. However, as shown in FIGS. 2 and 3, located in the bobbin space 116 is a constraint material 118 and a viscoelastic material 119. The bobbin space 116 is the space generally bounded by the voice coil 112. The viscoelastic material 119 in conjunction with the constraint material 118 combine to create a dampening effect on the voice coil 112.

The viscoelastic material 119 may be a double sided, pressure sensitive adhesive. The constraint material 118 may be any suitable material for example, aluminium, steel, zinc, copper, ceramic material, viscoelastic or elastomeric material. The viscoelastic material 119 and the constraint material 118 are selected so that the resultant dampener damps frequencies in the desired range of interest.

The voice coil 112, viscoelastic material 119 and constraint material 118 may be laminated together by heat curing and pressing the viscoelastic material 119 and/or the constraint material 118 to the voice coil 112. This "laminated" voice coil 112 may be at least partially overmolded with a plastics material. The overmold 120 of plastics material may include a settable thermoplastic compound and is illustrated in FIGS. 2 and 3. The plastics overmold holds the whole assembly together to ensure that all critical dimensions are maintained, yet it allows micro movement between the components for effective damping characteristics.

To illustrate the advantageous nature of an embodiment of the present invention we refer to the experimental results illustrated in FIGS. 4 to 16.

Figure 4:
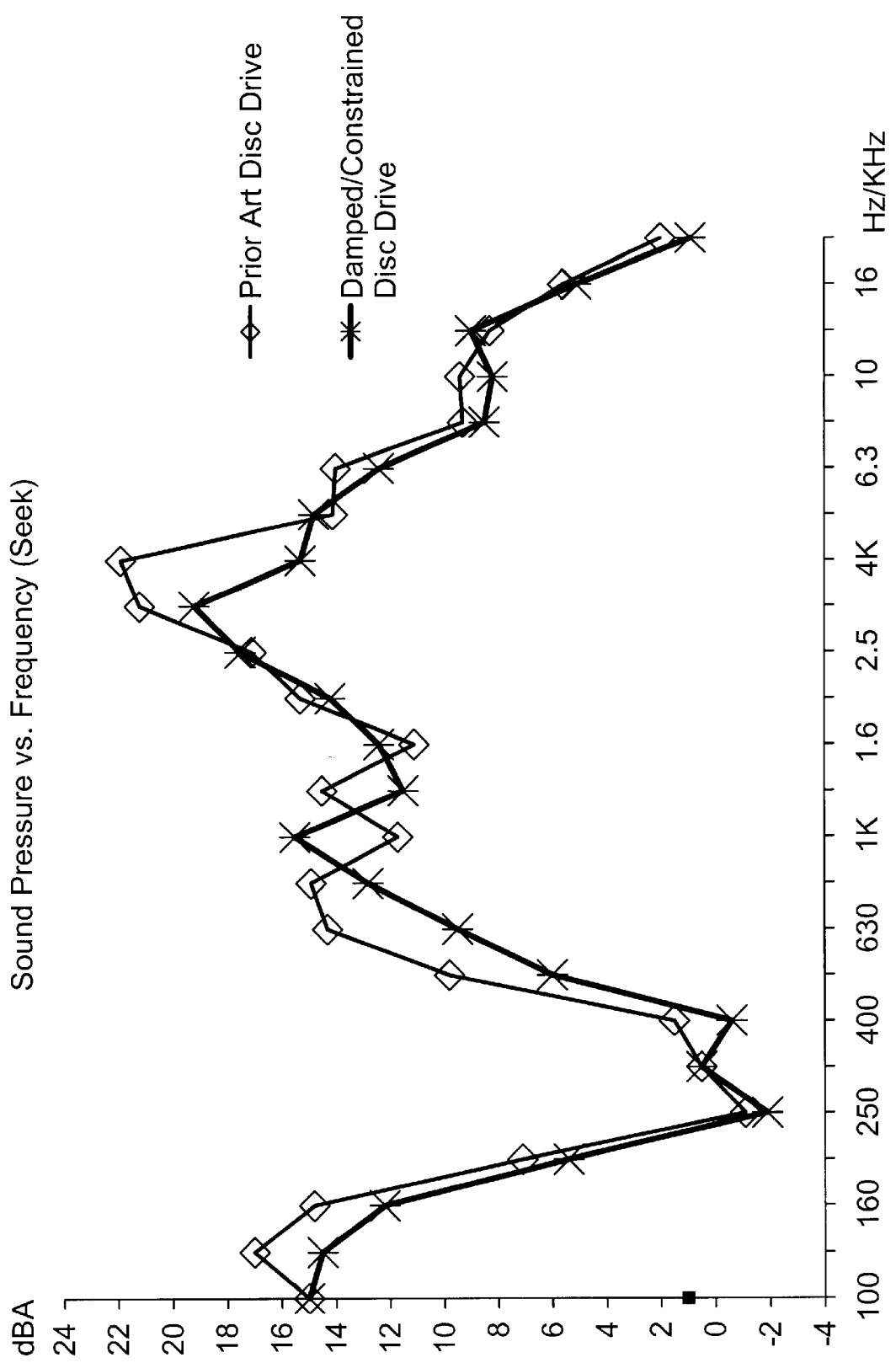
FIG. 4 is a graph comparing the acoustic performance of a prior art disc drive with a disc drive incorporating a damped voice coil motor according to an embodiment of the invention.
Figure 9:
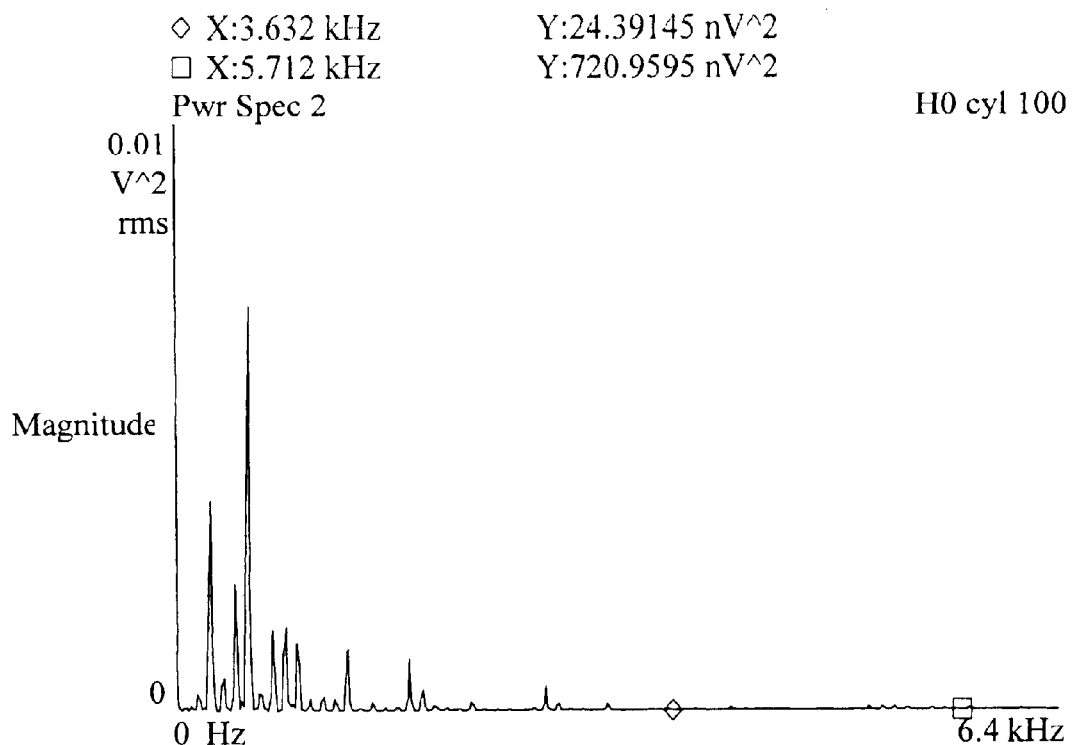
FIGS. 9 to 12 illustrate the positional error signal of a disc drive according to an embodiment of the invention at data track number 100, 1000, 2000 and 3000 respectively.
Figure 10:
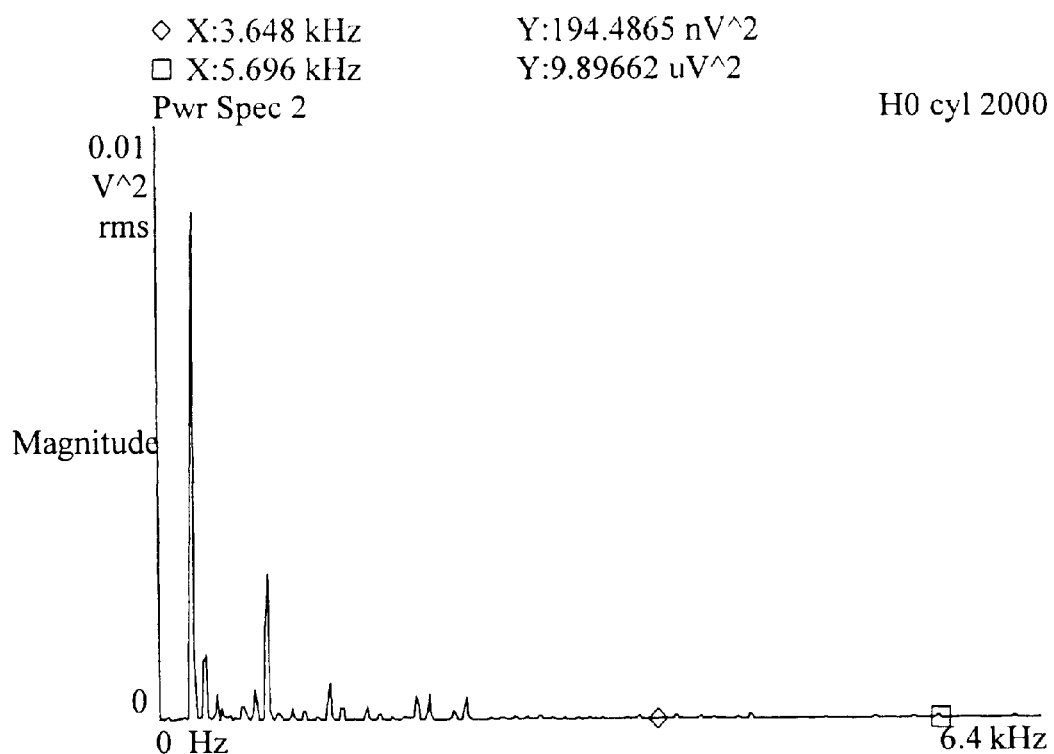
Figure 11:
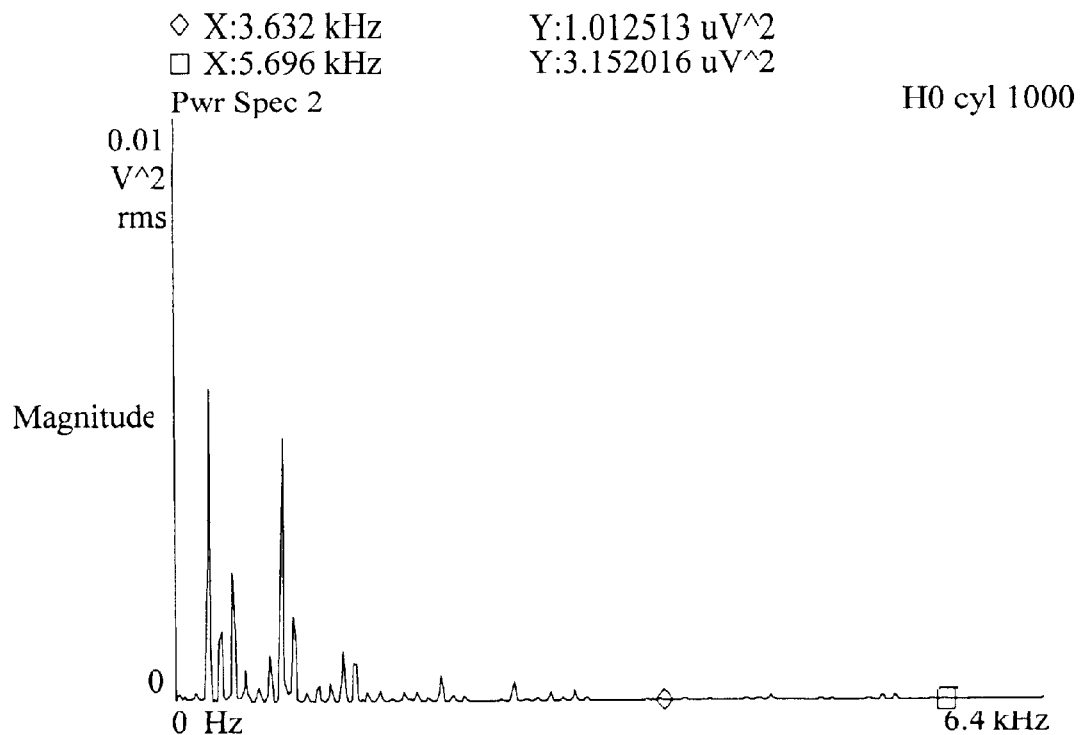
Figure 12:
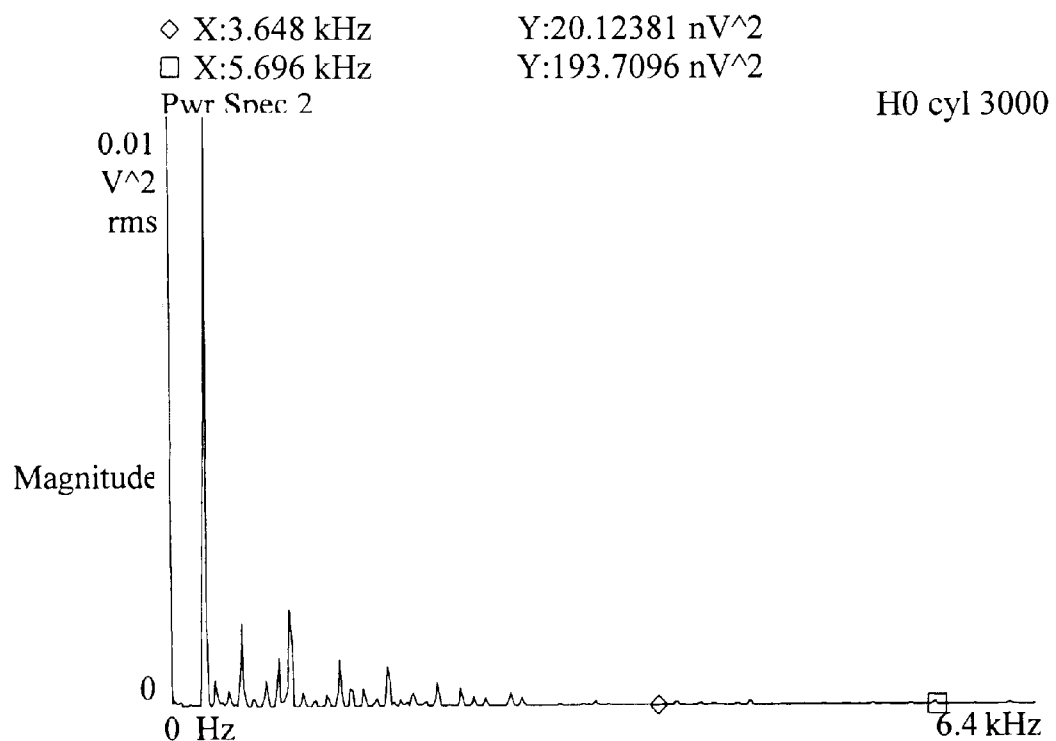

FIG. 4 illustrates the acoustic performance of a prior art disc drive as compared with a disc drive having a damped voice coil 112. As is shown in FIG. 4, reduced resonant frequency or sound power is evidenced in the 800 Hz to 1200 Hz range of the disc drive including the damped voice coil.

FIGS. 5 to 8 illustrate the positional error signal (PES) spectrum of a prior art disc drive at respective data track numbers 100, 1000, 2000 and 3000. FIGS. 9 to 12 illustrate the PES spectrum of a disc drive with a damped voice coil at respective data track numbers 100, 1000, 2000 and 3000. As can be seen in these Figures, at least a third order of reduction in the positional error signal is achieved using a disc drive in accordance with an embodiment of the present invention.

Figure 13:
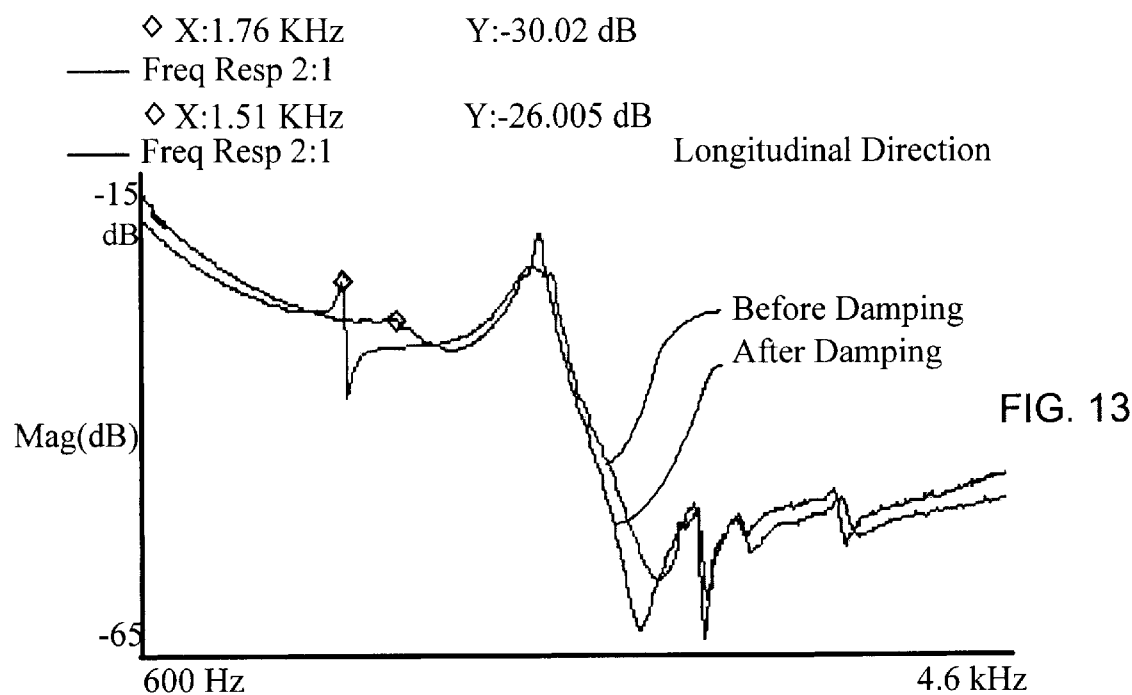
FIGS. 13 to 15 illustrate the vibration in respective y, x, and z directions of the slider of a prior art disc drive as opposed to the slider of a disc drive in accordance with an embodiment of the invention.
Figure 14:
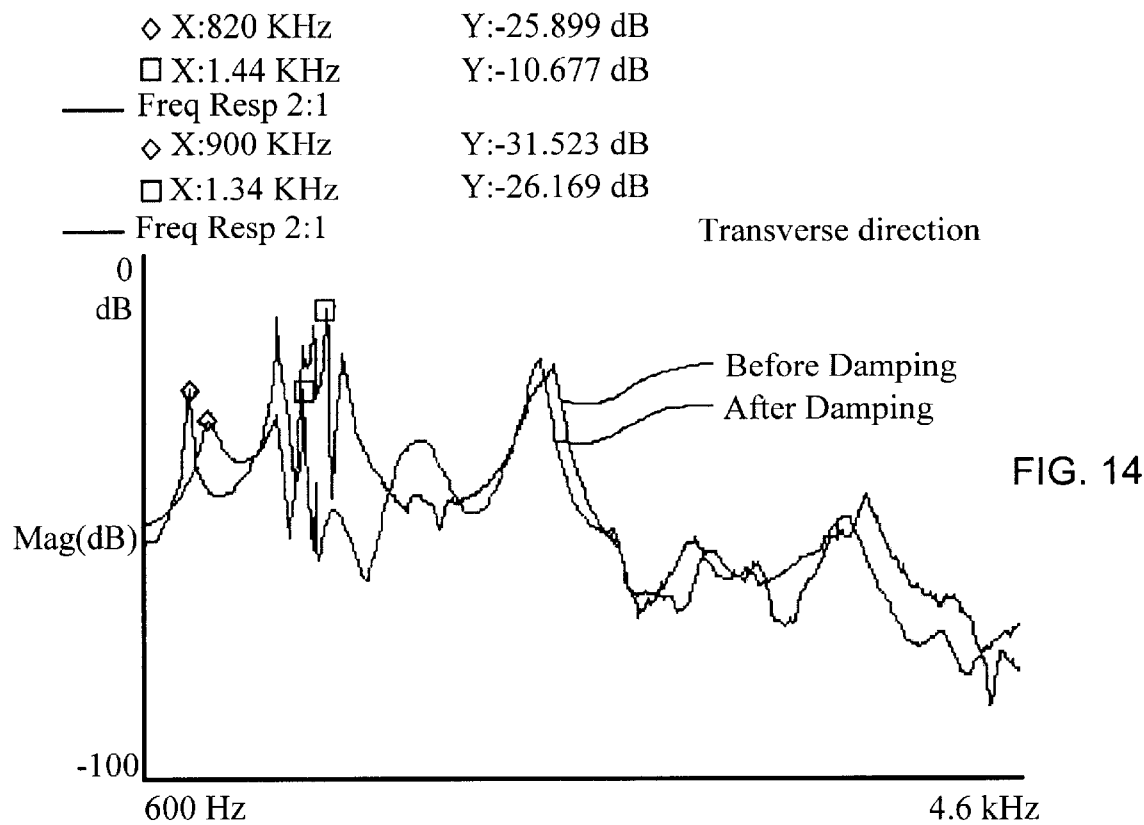
Figure 15:
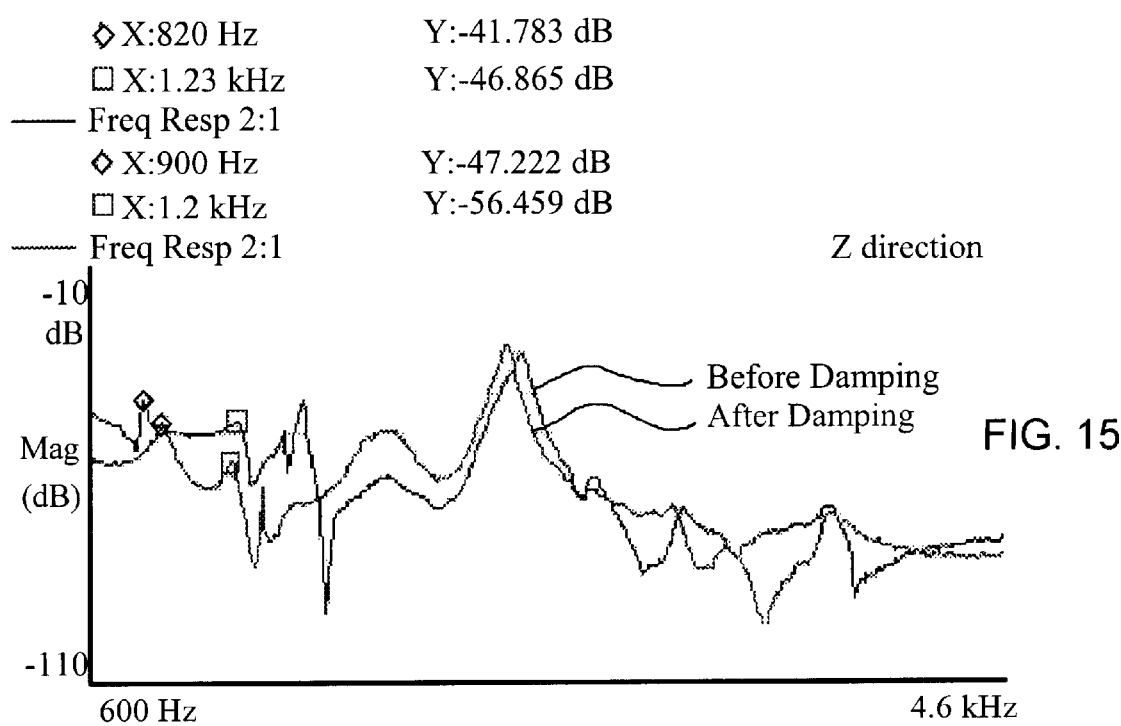
Figure 16:
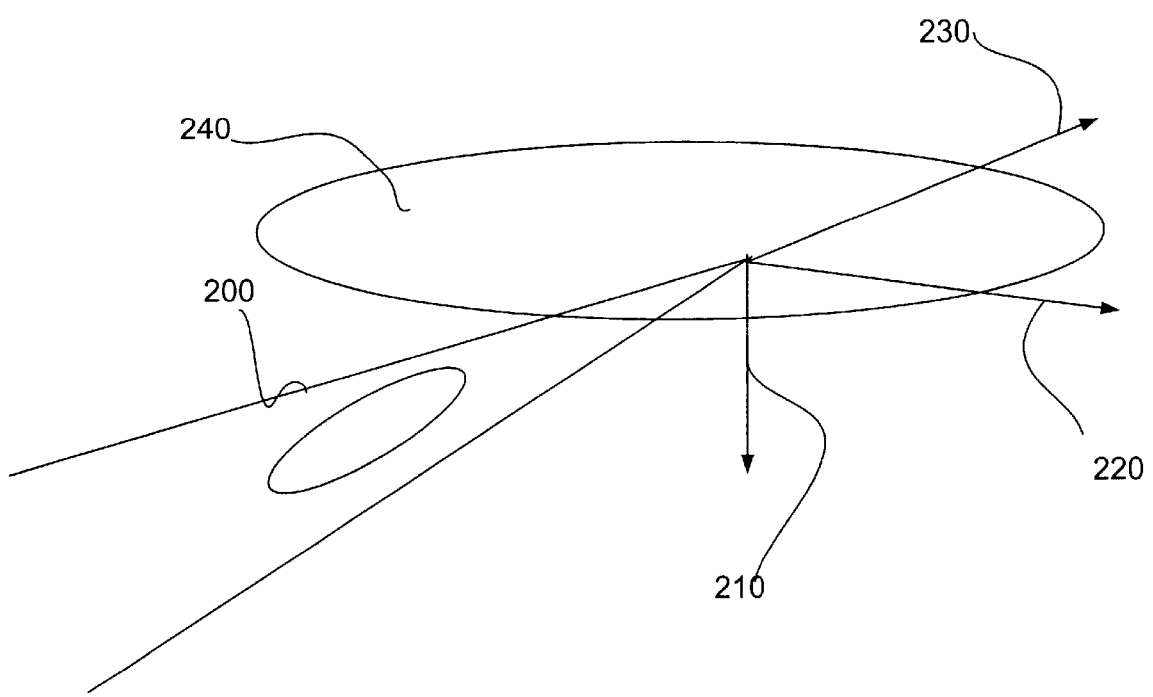
FIG. 16 illustrates the y, x and z directions as used in FIGS. 13 to 15.

FIGS. 13 and 15 illustrate the vibration of the slider of a prior art disc drive as opposed to the slider of a disc drive having a damped voice coil 112. FIGS. 13 to 15 respectively illustrate measured vibration in the y-direction 230, x-direction 210 and z-direction 220 as defined in FIG. 16. As can be seen from FIGS. 13 to 15 the magnitude of vibration decreased with the inclusion of the damped/constrained voice coil motor 112.

It will be appreciated from the above experimental results that the damping provided by an embodiment of the invention reduces the amplitude of vibrations experienced by the head positional assembly. It is also noted that the acoustic noise of the disc drive in accordance with an embodiment of the invention is reduced. This is particularly advantageous in situations where the disc drives are to be used in relatively quiet environments.

Additional advantages resulting from an embodiment of the present invention may include an overall improvement in the performance of the disc drive during read/write operations, a reduction in the transmissibility of the resonance frequencies of the voice coil motor to the slider, a stiffening in the structure of the voice coil motor thus increasing its structural natural frequency with lower amplitude vibration and a reduction in the rocking and torsional mode of the head positional assembly.

Another method to describe the invention is as follows:

In a disc drive, a voice coil 112 for a head positional assembly 100 having a dampener, that includes a constraint material 118 and a vicsoelastic material 119 such that the dampener is located in the bobbin space 116 of the voice coil 112. The viscoelastic material 119 is a double sided, pressure sensitive adhesive. And the constraint material 118 is selected from an aluminium, steel, zinc, copper, ceramic, viscoelastic or elastomeric material. The voice coil 112 is covered partially with plastics overmold 120.

According to the present invention, a disc drive 10 having a head positional assembly 100 with a voice coil 112, where the voice coil 112 includes a dampener, that is made of a constraint material 118 and a viscoelastic material 119. The dampener being located in the bobbin space 116 of the voice coil 112. And the viscoelastic material 119 is a double sided, pressure sensitive material while the constraint material 118 is selected from an aluminium, steel, zinc, copper, ceramic, viscoelastic or an elastomeric material. The voice coil 112 has at least a portion with plastic overmold. These features contribute to the disc drive 10 to have reduced resonant frequency in the 800 Hz to 1200 Hz range.

According to the present invention, there is provided a disc drive 112 has a head positional assembly 100 with a voice coil that includes a dampener, the dampener being arranged to dampen vibrations generated in the voice coil 112.

It is to be understood that even though numerous characteristics and advantages of the preferred embodiments of the present invention have been set forth in the foregoing description this disclosure is illustrative only, and changes may be made within the principles of the present invention to the full extent indicated by the broad general meaning of the terms in which the appended claims are expressed. For example, the particular elements may vary depending on the particular application of the head positional assembly, while maintaining substantially the same functionality without departing from the scope and spirit of the present invention. The number of layers in each laminated voice coil may also be varied if desired.

In addition, although the preferred embodiment described herein is directed to a head stack assembly for a magnetic disc drive, it will be appreciated by those skilled in the art that the teaching of the present invention can be applied to other systems, such as optical disc drives, without departing from the scope and spirit of the present invention.

What is claimed is:

1. A voice coil for a head positional assembly of a disc drive, the voice coil comprising:
   a wire coiled about an axis and defining a bobbin space; and
   a dampener located in the bobbin space, the dampener comprising:
      a constraint material; and
      a viscoelastic material, in which one of the constraint and viscoelastic materials comprises a surface oriented generally orthogonally with respect to the axis.

2. A voice coil as claimed in claim 1, wherein the viscoelastic material is a double sided, pressure sensitive adhesive.

3. A voice coil as claimed in claim 2, wherein the constraint material is selected from a group consisting of: aluminium, steel, zinc, copper, ceramic, viscoelastic, and elastomeric material.

4. A voice coil as claimed in claim 1, wherein the voice coil has a plastic overmold over at least a portion thereof.

5. A voice coil according to claim 1, in which the one material comprises the viscoelastic material.

6. A voice coil according to claim 1, in which each of the constraint and viscoelastic materials comprises a surface oriented orthogonally with respect to the axis.

7. A voice coil according to claim 1, in which each of the constraint and viscoelastic materials comprises a generally planar layer.

8. A voice coil assembly for a head positional assembly of a disc drive, the voice coil comprising:
   a coiled wire defining a bobbin space; and
   a dampener located in the bobbin space, said dampener comprising:
      a constraint material; and
      a viscoelastic material.

9. A voice coil assembly according to claim 8, wherein the viscoelastic material is a double sided, pressure sensitive material.

10. A voice coil assembly according to claim 8, wherein the constraint material is selected from a group consisting of: aluminium, steel, zinc, copper, ceramic, viscoelastic, and elastomeric material.

11. A voice coil assembly according to claim 8, wherein the voice coil has a plastic overmold over at least a portion thereof.

12. A voice coil assembly according to claim 8, in which the one of the constraint and viscoelastic materials comprises a generally planar layer.

13. A voice coil assembly according to claim 8, in which each of the constraint and viscoelastic materials comprises a generally planar layer.

14. A voice coil assembly according to claim 8, in which the wire is coiled about an axis, and in which the constraint and viscoelastic layers are oriented generally orthogonally with respect to the axis.

15. A disc drive comprising:
   a head positional assembly having a voice coil defining a bobbin space; and
   dampener means in the bobbin space for dampening vibrations generated in the voice coil.

16. A disc drive according to claim 15 having reduced resonant frequency in the 800 Hz to 1200 Hz range.

17. A disc drive according to claim 15, in which the dampener means comprises:
   an adhesive material.

18. A disc drive according to claim 15 in which the dampener means comprises:
   a metallic material.

* * * * *